United States Patent
Kang et al.

(10) Patent No.: US 7,507,075 B2
(45) Date of Patent: Mar. 24, 2009

(54) MISTAKE PROOF IDENTIFICATION FEATURE FOR TURBINE BLADES

(75) Inventors: Moon-Kyoo Brian Kang, Vernon, CT (US); Kenneth A. Lonczak, Meriden, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 521 days.

(21) Appl. No.: 11/204,257

(22) Filed: Aug. 15, 2005

(65) Prior Publication Data

US 2007/0036656 A1 Feb. 15, 2007

(51) Int. Cl.
*F01D 5/30* (2006.01)
(52) U.S. Cl. ........................................ 416/248
(58) Field of Classification Search ........... 416/248
See application file for complete search history.

(56) References Cited

U.S. PATENT DOCUMENTS

| 6,416,282 | B1 | 7/2002 | Beeck et al. |
| 6,533,550 | B1 * | 3/2003 | Mills ........................... 416/248 |
| 6,582,197 | B2 * | 6/2003 | Coulson ................. 416/241 R |
| 6,764,282 | B2 | 7/2004 | Suciu et al. |
| 6,786,696 | B2 | 9/2004 | Herman et al. |
| 6,893,226 | B2 | 5/2005 | Phipps |

* cited by examiner

*Primary Examiner*—Richard Edgar
(74) *Attorney, Agent, or Firm*—Kinney & Lange, P.A.

(57) ABSTRACT

An identification feature is used to unmistakably identify internal features present in different generations of turbine blade designs. The identification feature is located on a root portion of the turbine blade and protrudes to provide a visually identifiable feature that is also readable by a coordinate measuring machine, but does not interfere with installation or operation of the turbine blade. The weight of the identification feature is in a specific proportion to the weight of the turbine blade in order to prevent interfere with operation of the turbine blade during high-speed rotation in a gas turbine engine.

16 Claims, 3 Drawing Sheets

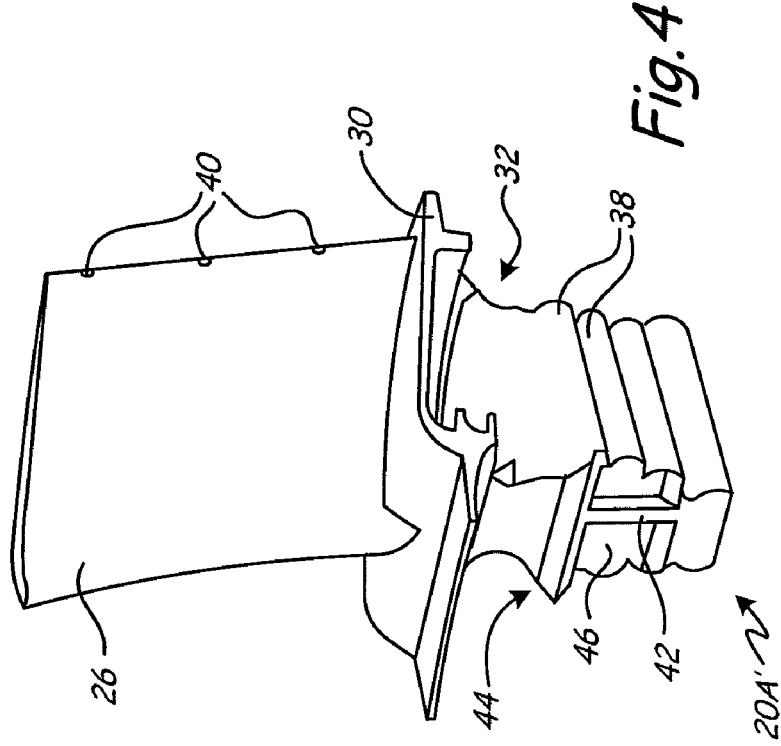
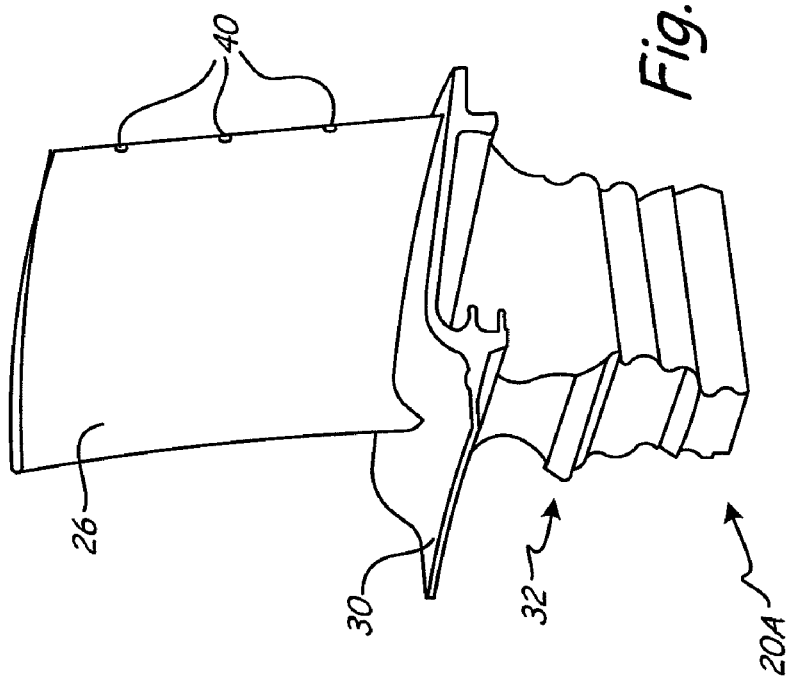

MISTAKE PROOF IDENTIFICATION FEATURE FOR TURBINE BLADES

BACKGROUND OF THE INVENTION

This invention relates generally to gas turbine engines and more particularly to identification of turbine blades having internal features. In gas turbine engines, fuel is combusted in compressed air created by a compressor to produce heated gases. The heated gases are used to turn turbine blades, or airfoils, to produce rotational power for, among other things, operating the compressor. During operation of the gas turbine engine, temperatures inside the combustion chamber can reach 2500° F., resulting in the blades being subject to temperatures in excess of 1700° F. In order to cool the turbine blades, relatively cooler compressed air that bypasses the combustion chamber, or bleed air, is forced through internal passages of the blades. The passages include pathways or channels having various geometries in order to direct the bleed air throughout the interior of the blade. The bleed air flowing through the passages maintains a temperature gradient throughout the entirety of the blade at which the blade can properly function.

For performance or manufacturing reasons, it is sometimes necessary to change or modify the interior features of a particular blade model. Meanwhile, the exterior of that blade must be maintained the same in order to meet the design of the specific gas turbine engines in which that model of blade is used. Traditionally, a model number that identifies the interior features of the turbine blade is cast on the exterior of the turbine blade casting. The cast model numbers produce a shallowly indented number on the surface of the turbine blade. The shallow numbers do not create any protrusions or cavities that upset the balance of the blade while it is rotating. Any, even small, disproportion of weight along the length of the turbine blade can produce vibrations during the high-speed rotations produced in gas turbine engines.

While the cast model numbers are small enough to prevent any interference with the operation or installation of the blade, the numerals are often illegible and confusingly similar. For example, a cast "9" may look like a "0." Thus, a turbine blade having second generation internal features would look identical to a turbine blade having first generation internal features, and there would be no positive way to identify which generation of internal features it possesses. Therefore, blades could be improperly introduced into the production stream where they would receive incorrect finishing procedures that are not discovered until a later time. It is desirable for production cost and safety considerations to completely eliminate the possibility of these mistakes. There is, therefore, a need for a turbine blade having an identification feature that unmistakably identifies the internal features of visually identical turbine blades without interfering with the operation of the blade itself.

BRIEF SUMMARY OF THE INVENTION

The present invention is directed towards a positive identification feature used to identify internal features of turbine blades. The invention comprises a protruding identification that unmistakably identifies the internal features of the turbine blade. The protruding identification feature is visually identifiable and readable by a coordinate measuring machine. The protruding identification feature is located on a root portion of the turbine blade so as to prevent interference with installation of the turbine blade. The protruding identification feature weighs approximately 0.1% or less of the weight of the turbine blade in order to prevent interference with operation of the turbine blade.

BRIEF DESCRIPTION OF THE DRAWINGS

FIG. 3 shows the root section of a turbine blade having first generation internal features.

FIG. 4 shows the root section of a turbine blade having second generation internal features in which the present invention is used.

DETAILED DESCRIPTION

Figure 1:
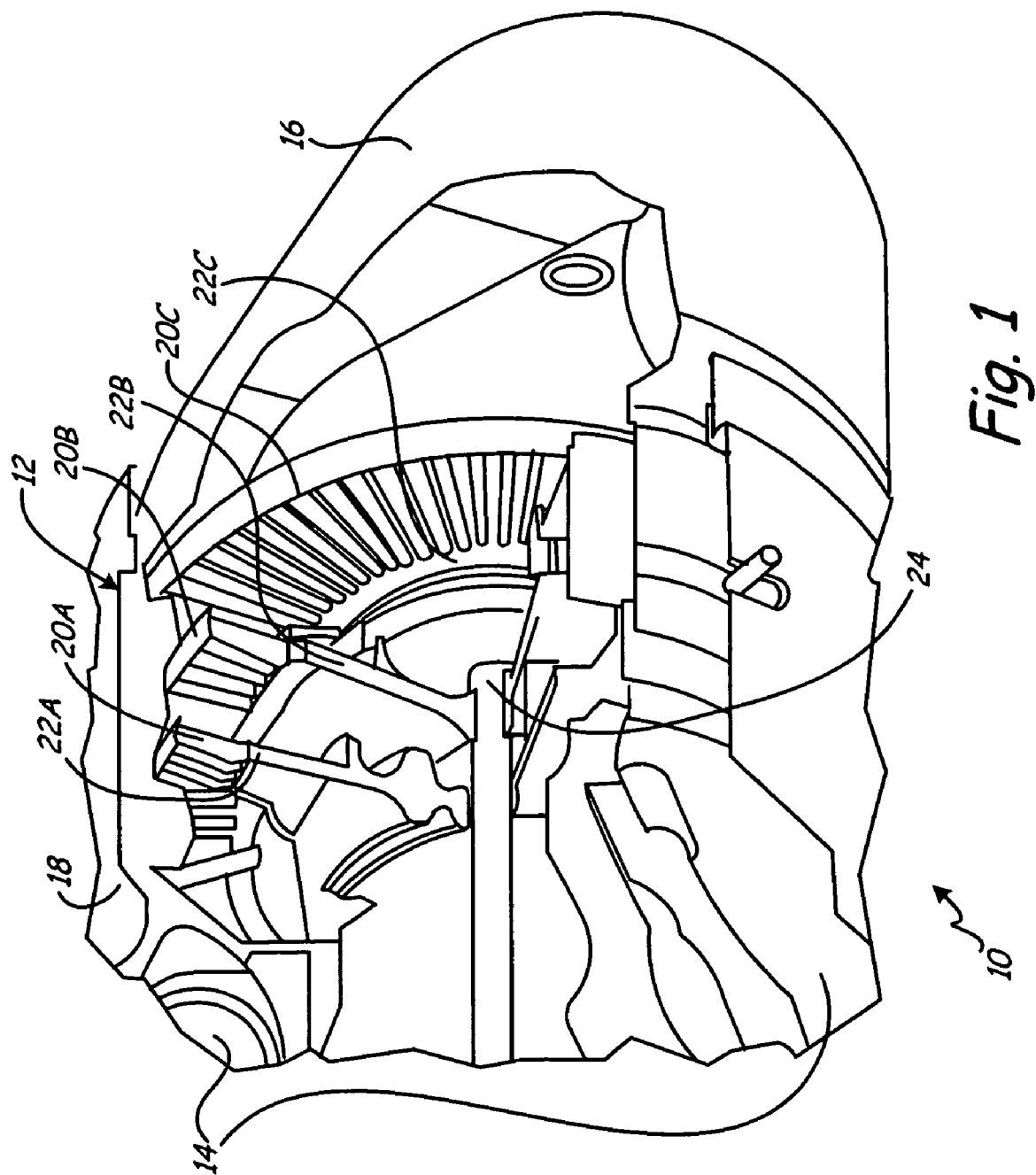
FIG. 1 shows a partially cut away perspective view of a gas turbine engine showing a turbine section in which the present invention is used.

FIG. 1 shows a partially cut away perspective view of gas turbine engine 10 showing turbine section 12 in which the present invention is used. Gas turbine engine 10 includes turbine section 12, which is positioned between combustion chamber 14 and nozzle 16. Casing 18 shrouds turbine section 12, combustion chamber 14 and nozzle 16. Turbine section 10 is a multi-stage turbine and includes turbine blades 20A, 20B and 20C; rotor discs 22A, 22B and 22C and turbine shaft 24. Turbine blades 20A, 20B and 20C are radially aligned around the periphery of rotor discs 22A, 22B and 22C, respectively. Rotor discs 22A, 22B and 22C are co-axially attached to turbine shaft 24, which extends in an axial direction into gas turbine engine 10.

Fuel is combusted in high-pressure air inside combustion chamber 14 in order to produce heated gases having high density and high pressure. As the heated gases exit combustion chamber 14, they enter turbine section 12 at a high velocity. The high-density gases impinge on turbine blades 20A, 20B and 20C to produce rotational movement of rotor discs 22A, 22B and 22C, which in turn rotate turbine shaft 24. Rotation of turbine shaft 24 produces mechanical power for driving the compressor section of gas turbine engine 10. The heated gases continue through turbine section 12 and are forced through nozzle 16. Nozzle 16 increases the velocity of the gases as they exit gas turbine engine 10 in order to produce forward thrust for propelling an aircraft.

Figure 2:
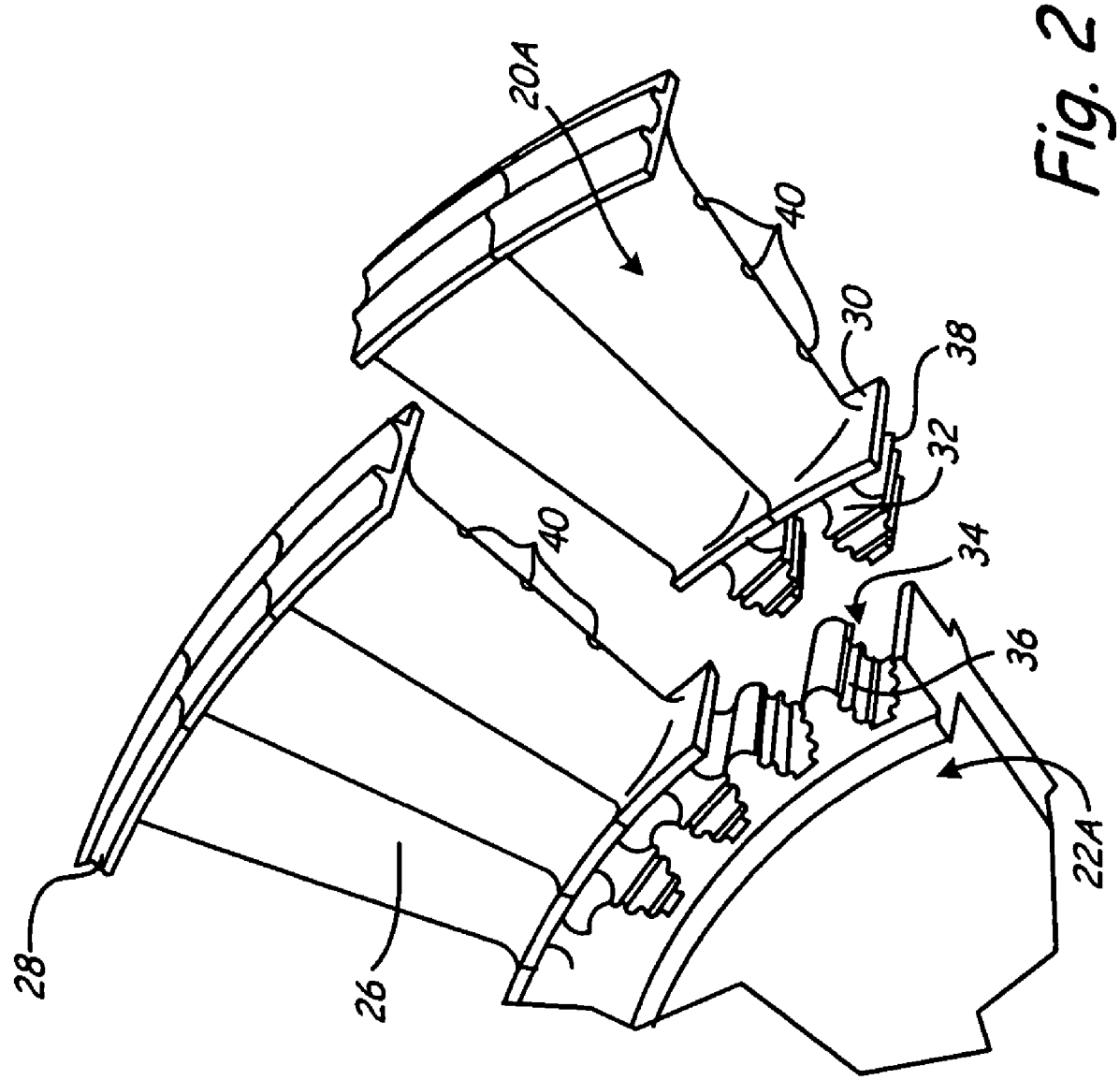
FIG. 2 shows a partially exploded perspective view of the turbine section of FIG. 1 showing a turbine blade and rotor disc assembly.

FIG. 2 shows a partially exploded perspective view of cut away turbine section 12 of FIG. 1 showing the assembly of turbine blades 20A and rotor disc 22A. Turbine blades 20A are radially arranged around the outer circumference of rotor disc 22A. Turbine blades 20A include foil 26, shroud 28, platform 30 and root 32. Rotor disc 22A includes slots 34 aligned along the outer circumference of rotor disc 22A. Slots 34 receive roots 32 of turbine blades 20A. Slots 34 include serrations 36, and roots 32 include tangs 38 having a matching profile with that of serrations 36. In typical embodiments, roots 32 have a "fir tree" or "dove tail" configuration as is known in the art. Roots 32 are inserted into slots 34 the axial direction so tangs 38 are locked into serrations 36. Tangs 38 and serrations 36 secure turbine blade 20A in the radial direction during rotation of rotor disc 22A and distribute the load produced by the centrifugal momentum of rotating turbine blade 20A. Serrations 36 and tangs 38 also allow for thermal expansion of roots 30 and rotor disc 22A in the extreme temperatures reached in gas turbine engine 10. Additionally, rivets or other fastening mechanisms are used to hold turbine blades 20A in the axial direction.

When turbine blades 20A are inserted into rotor disc 22A, shrouds 28 align to form a continuous barrier that assists in preventing gas leakage around the tips of the turbine blade. Shrouds 28 also prevent vibration and bending of foils 26. In other embodiments, shrouds 28 are not used and the blade tips of foils 26 are cut to a knife-edge tip. Similarly, platforms 30 align to form a continuous boundary between turbine blades 20A and roots 30.

Typically, bleed air used for cooling turbine blades 20A is introduced through an opening located on the bottom of root 32, whereby it enters passages of an interior cooling system. The interior cooling system includes various features and passages in which the bleed air flows. The bleed air travels through the passages on the interior of turbine blade 20A and whisks heat away from foil 26. Typically, the heated bleed air exits the interior of turbine blade 20A through one or more small orifices 40 located on the trailing edge of foil 26 or on the concave suction side (not shown) of foil 26.

FIG. 3 shows the root section of turbine blade 20A having first generation internal features. For a particular turbine blade design, changes to the interior features may occur mid-production to increase performance of the blade. However, the exterior of every generation of turbine blade 20A is identical to each other, thereby producing an interchangeable part that will always fit in the gas turbine engines it was designed for use in.

FIG. 4 shows root section 32 of turbine blade 20A' having second generation, or post-modification, interior features in which the present invention is used. Once a change has been made to the interior design of the model of turbine blade comprising turbine blade 20A, identification feature 42 is added to root section 32 to produce turbine blade 20A'. Identification feature 42 provides a mistake proof means for distinguishing turbine blade 20A from 20A'.

Identification feature 42 provides a positive, raised protuberance that can be recognized by visual inspection. Identification feature 42 also provides a feature that can be measured with a Coordinate Measuring Machine (CMM). During manufacture of turbine blade 20A' the blade is inspected for dimensional tolerances before being sent for additional machining procedures. Identification feature 42 provides a positive feature that can be included in the dimensional tolerance checklist and checked for with the CMM. This ensures that the turbine blade being inspected is in fact turbine blade 20A' and that it will receive machining procedures intended for blades with second generation internal features.

The location of identification feature 42 is selected to not interfere with the operation of turbine blade 20A'. For example, it is unfeasible to put an identifying mark on foil portion 26 because that would interfere with impingement of the hot air on foil 26 and would cause vibration of foil 26. For similar reasons, it would be unfeasible to put an identifying feature on shroud 28 or platform 30. Also, it is impracticable to put an identifying feature in the sides of root portion 32 because that would interfere with alignment of serrations 36 and tangs 38. Considering these factors, identification feature 42 is placed on front surface 44 of root portion 32. In other embodiments, identification feature 42 is placed on the rear surface of root portion 32. In FIG. 4 identification feature 42 is placed on root portion 32 off-center of front surface 44. This moves identification feature away from the parting line of the casting of turbine blade 20A' and allows the mold for turbine blade 20A to be adapted for forming turbine blade 20A'. In other embodiments, identification feature 42 is centered on front surface 44 of root portion 32. Placing identification feature 42 on root portion 32 also minimizes the vibration effect caused by identification feature 42 on foil 26.

To further prevent identification feature 42 from interfering with operation and installation of turbine blade 20A', identification feature 42 is placed in recess 46 located on front surface 44 of root portion 32. Recess 46 is pre-formed into the casting of turbine blade 20A' for weight reduction purposes or other functional purposes. Additionally, recess 46 can be machined into turbine blade 20A' for the purposes of receiving identification feature 42. Thus, in order to minimize the interference of identification feature 42 on the installation and operation of turbine blade 20A', identification feature 42 does not extend beyond the forward most portion of the leading edge of root portion 32.

During operation of gas turbine engine 10, rotor disc 22A rotates at speeds of approximately 15000 revolutions per minute (RPM). During these high-speed rotations the tangential velocity of the tips of turbine blade 20A' can reach speeds up to Mach 2. Thus, placing even a small amount of mass on turbine blade 20A' creates a large force that will interfere with true rotation of rotor disc 22A and foil 26. The centrifugal force generated by the mass of identification feature 42 has the potential to create vibrations in the rotation of turbine blade 20A'. When the centrifugal forces exert stresses beyond the stress limits of turbine blade 20A', especially compounded with resonance vibration, catastrophic failure of turbine blade 20A' will occur.

Using standard mechanics formulas, the size and mass of an identification feature 42 that will not cause excessive stresses in turbine blade 20A' can be determined. It has been determined that when placing identification feature 42 on root portion 32, an identification feature weighing approximately 0.1% or less of the total weight of turbine blade 20A will not produce excessive stresses in turbine blade 20A'. Therefore, in one embodiment, identification feature 42 weighs 0.1% of turbine blade 20A'. For example, if turbine blade 20A' weighs 0.84 lbs., identification feature 42 weighs approximately 0.0008 lbs. or less. This prevents excessive stresses in and vibration of turbine blade 20A' during high-speed rotation of rotor disc 22A during operation of gas turbine engine 10.

The specific shape of identification feature 42 can have various embodiments. In FIG. 4, identification feature 42 is a vertical rib. An additional vertical rib identification feature 42, or a differently shaped identification feature 42, can be added to identify each subsequent generation of turbine blade 20A. In various embodiments, identification feature 42 can be circular, star shaped or triangular. The size and shape of each identification feature, or the plurality of identification features, is limited by being maintained at or below approximately 0.1% of the weight of turbine blade 20A to prevent perturbation of turbine blade 20A' during rotation of rotor disc 22A. The size and shape of identification feature is also limited because it must not interfere with the installation of turbine blade 20A'.

The present invention has been described as applied to turbine blades used in the turbine section of a gas turbine engine. The protruding identification feature can also be used in rotor blades used in the compressor section of gas turbine engines or in other rotating foils or blades having varying interior features.

Although the present invention has been described with reference to preferred embodiments, workers skilled in the art will recognize that changes may be made in form and detail without departing from the spirit and scope of the invention.

The invention claimed is:

1. A turbine blade comprising:
 a foil portion having internal cooling features; and
 a root portion comprising:
  a leading edge surface;

a trailing edge surface;
a plurality of locking tangs positioned between the leading edge surface and the trailing edge surface; and
a single-character protruding identification feature weighing approximately equal to or less than 0.1% of a weight of the turbine blade and located on a recessed surface of the root portion of the turbine blade so as to not extend beyond an outermost surface of the root portion, the protruding identification feature uniquely representing a generation of the internal cooling features of the turbine blade.

2. The turbine of claim 1 wherein the single-character identification feature is located on the leading edge surface.

3. The turbine blade of claim 2 wherein the single-character identification feature is a single elongate rib having a major axis extending in a longitudinal direction with respect to the turbine blade.

4. The turbine blade of claim 3 wherein the vertical rib is offset from a center of the leading edge of the root portion so as to be offset from a casting parting line.

5. The turbine blade of claim 1 wherein the internal cooling feature comprises trailing edge cooling holes.

6. A method for producing a turbine blade having internal cooling features, the method comprising:
producing a turbine blade comprising:
an airfoil portion comprising:
an exterior gas path surface; and
an interior cooling feature having a specific configuration; and
a root portion comprising:
a leading edge surface;
a trailing edge surface; and
a plurality of locking tangs positioned on side surfaces between the leading edge surface and the trailing edge surface;
producing a single-character external identification feature having a geometry uniquely identifying the specific configuration of the interior cooling feature, the external identification feature positioned on the root portion of the turbine blade;
visually identifying the external identification feature; and
performing machining procedures on the turbine blade correlated to the external identification feature.

7. The method of producing a turbine blade of claim 6 wherein the step of visually identifying the external identification feature comprises:
measuring the external identification feature with a coordinate measuring machine verify the specific configuration of the interior cooling feature.

8. The method of producing a turbine blade of claim 7 wherein the step of performing machining procedures further comprises producing features on the turbine blade corresponding to the verified specific configuration of the interior cooling feature.

9. The method of producing a turbine blade of claim 8 wherein the step of producing features on the turbine blade corresponding to the specific configuration of the interior cooling feature further comprises producing cooling holes into a trailing edge of the airfoil.

10. The method of producing a turbine blade of claim 6 wherein the step of producing the root portion of the turbine blade further comprises:
producing a recessed leading edge pocket on the root portion; and
positioning the external identification feature in the pocket such that the identification features does not extend beyond the leading edge surface;
wherein the identification feature comprises a raised bar extending longitudinally across the recessed leading edge pocket at a position offset from a center of the root portion.

11. A method for producing a redesigned turbine blade, the method comprising:
designing a turbine blade comprising:
a gas path portion having a first generation cooling feature; and
a root portion comprising:
a leading edge surface;
a trailing edge surface; and
a plurality of locking tangs positioned on side surfaces between the leading edge surface and the trailing edge surface;
redesigning the turbine blade such that the gas path portion includes a second generation cooling feature; and
producing the turbine blade to include an external identification feature on the root portion to uniquely indicate the second generation cooling feature.

12. The method for producing a redesigned turbine blade of claim 11 wherein the external identification feature comprises a single-character feature.

13. The method for producing a redesigned turbine blade of claim 12 wherein the external identification feature comprises:
a raised protrubrance located on a recessed surface of the root portion of the turbine blade so as to not extend beyond an outermost surface of the root portion.

14. The method for producing a redesigned turbine blade of claim 12 wherein the external identification feature comprises:
a longitudinal rib offset from a center of the leading edge of the root portion so as to be positioned away from a casting parting line of the redesigned turbine blade.

15. The method for producing a redesigned turbine blade of claim 11 wherein the external identification feature is approximately equal to or less than 0.1% of a weight of the turbine blade.

16. The method for producing a redesigned turbine blade of claim 11 and further comprising identifying the external identification feature using a coordinate measuring machine.

* * * * *

UNITED STATES PATENT AND TRADEMARK OFFICE
CERTIFICATE OF CORRECTION

| | | |
|---|---|---|
| PATENT NO. | : 7,507,075 B2 | Page 1 of 1 |
| APPLICATION NO. | : 11/204257 | |
| DATED | : March 24, 2009 | |
| INVENTOR(S) | : Moon-Kyoo Brian Kang et al. | |

It is certified that error appears in the above-identified patent and that said Letters Patent is hereby corrected as shown below:

In Claim 7, Column 5, Line 48, delete "machine verify", insert --machine to verify--

Signed and Sealed this

Eighteenth Day of May, 2010

David J. Kappos
*Director of the United States Patent and Trademark Office*